Patented May 14, 1935

2,001,194

UNITED STATES PATENT OFFICE 2,001,194

PROCESS OF TREATING BRAKELINING AND IMPREGNATING COMPOUND FOR SAME

Olaus T. Hodnefield, Glendale, Calif.

No Drawing. Application October 29, 1930, Serial No. 492,098. Renewed September 19, 1934

6 Claims. (Cl. 134—11)

The object of my invention is the production of an impregnating compound for brake lining whereby the fabric of the brake lining is placed in a fireproof state, and materially toughened in its wearing characteristics.

Another and a very important object of my invention is the provision of a composition that will act as a retardant against mildew, fungi and insect pests.

A still further object is a composition of said nature which will not corrode metal when applied to cloth to which the metal may be attached.

Another object, is the provision of a composition that remains odorless under the braking heat, unburnable, slip and squeak proof, a decidedly common occurence with automotive brakes and oil rig brakes for example, in present day use.

And a further object is the provision of a composition that will not rot or in anywise weaken the texture of the brake lining, but on the contrary, will materially preserve and strengthen it as well.

When prepared for brake lining, I heat 100 gallons of distilled water to 150 degrees F. and while thoroughly agitating, I add from 10 to 20 grams of aniline dye, 60 pounds of ammonium sulphate (good commercial), 10 pounds ammonium phosphate (good monobasic) and 12 pounds of boric acid crystals or granular borax of not less than 50% boric acid content. To 4 pounds gum acacia (good commercial) dissolved in cold distilled water, I add 2 pounds cresley ore or sodium borate and mix with the above, thence I dissolve 4 pounds of barium hydroxide in 1 quart aqua ammonia (14% solution) in which solution I also dissolve 2 pounds of ammonium aluminum sulphate and 1½ pounds of copper sodium alginate kept in a concentrated wet state, carefully washed in distilled water before intermixing with the aforesaid aqua-ammonia solution, the whole being added to the former, thence I add 1 ounce of benzaldehyde as an insecticide and deodorant, and 2 pounds of bicarbonate of soda, slowly, the latter acting as a ballancer against corrosion, both of said ingredients aiding materially in combining the mixture as well.

Thereafter, the solution is drawn off into a tank where it is subjected to a pressure of 100 pounds for a period of about 30 minutes to more thoroughly attenuate and commingle the ingredients, after which it is strained and placed in suitable containers for use.

In its application to the treatment of brake lining, the latter is placed in a suitable air-tight liquid receptacle and therein under a pressure of from 100 to 125 pounds impregnated with the solution for a period approximating 1½ to 2 hours, the nature of the textile and the thickness of the lining being the determining factor as to the length of time. After drawing off the solution from the tank, the lining is removed from the receptacle (tank) and placed in a heated air circulating drying chamber for a period of from 4 to 6 hours, the length of time depending upon the drying qualities of the lining. When dry, the lining is packed for shipment and use.

Said method of air drying the impregnated brake lining is a material factor in securing the highly beneficial results obtained. It eliminates the inherent danger of the impregnating compound case hardening on the surface of the lining and leaving a moist interior. This is highly essential for durability and satisfactory service.

Articles impregnated with my composition will not burn. My composition as a whole, possesses in a high degree all the desired properties a fireproofing composition should have.

Brake lining so treated is considerably toughened, made squeak and slip proof, the composition leaving a fine transparent film over the surface as well as therethrough, braking heat, oil, grime and road dirt accumulations having no detrimental effect thereon.

My composition acts as a deodorizing and non-corrosive agent, adds no material weight to the article treated, and being readily produced from chemicals obtainable in the open market at no great expense, is as economical as it is desirable for the purpose intended.

In practice it may be essential from time to time to vary the quantities and the ingredients somewhat without reaching beyond the scope of the present invention, hence, I do not limit my invention strictly to the composition herein described, but what I do claim is:

1. A composition for fireproofing brake lining formed by mixing the following ingredients in the following proportions: 10 to 20 grams of aniline dye, 60 pounds ammonium sulphate, 10 pounds ammonium phosphate, 12 pounds boric acid crystals, 4 pounds gum acacia, 2 pounds cresley ore, 4 pounds barium hydroxide, 1 quart aqua ammonia, 2 pounds ammonium aluminum sulphate, 1½ pounds copper sodium alginate, 1 ounce benzaldehyde, 2 pounds bicarbonate of soda and 100 gallons distilled water as to produce a non-flammable and on the whole non-combustible compound and capable of use when melted for impregnating brake lining to make it fireproof.

2. A composition for fireproofing brake lining formed by mixing of the following ingredients in the following proportions: 10 to 20 grams of aniline dye, 60 pounds of ammonium sulphate, 10 pounds ammonium phosphate, 12 pounds boric acid crystals, 4 pounds gum acacia, 2 pounds cresley ore, 4 pounds barium hydroxide, 1 quart aqua ammonia, 2 pounds ammonium aluminum sulphate, 1½ pounds copper sodium alginate, 1 ounce benzaldehyde, 2 pounds bicarbonate of soda, and enough distilled water to make up 100 gallons.

3. A composition product composed of the article treated with the chemical solution set forth in claim 1 to form a new product in an article of manufacture and having the tendency to render said article fire and moisture proof.

4. A composition product wherein a base portion comprising the article as a product of manufacture is chemically treated with a solution formed by mixing 10 to 20 grams of aniline dye, 60 pounds ammonium sulphate, 10 pounds ammonium phosphate, 12 pounds boric acid crystals, 4 pounds gum acacia, 2 pounds cresley ore, 4 pounds barium hydroxide, 1 quart aqua ammonia, 2 pounds ammonium aluminum sulphate, 1½ pounds copper sodium alginate, 1 ounce benzaldehyde, 2 pounds bicarbonate of soda and 100 gallons distilled water, and whereby the chemical treated article is rendered fire and moisture resisting.

5. As an new article of manufacture, a brake lining material consisting of a base substance to form brake lining upon being chemically treated with an impregnating solution comprising the prepared chemical composition formed as set forth in claim 4.

6. A composition product prepared by impregnating in a chemical solution a base material to comprise a product of manufacture rendered fire and moisture resistant, and comprising the base material impregnated with a solution of from 10 to 20 grams of aniline dye, 60 pounds of ammonium sulphate, 10 pounds ammonium phosphate, 12 pounds boric acid crystals, 4 pounds gum acacia, 2 pounds cresley ore, 4 pounds barium hydroxide, 1 quart aqua ammonia, 2 pounds ammonium aluminum sulphate, 1½ pounds copper sodium alginate, 1 ounce benzaldehyde, 2 pounds bicarbonate of soda, and distilled water to provide in solution 100 gallons.

OLAUS T. HODNEFIELD.